United States Patent
Lee et al.

(10) Patent No.: US 11,567,607 B2
(45) Date of Patent: *Jan. 31, 2023

(54) DISPLAY DEVICE INCLUDING TOUCH SENSOR

(71) Applicant: Samsung Display Co., Ltd., Yongin-si (KR)

(72) Inventors: Il Ho Lee, Asan-si (KR); Seung-Hee Lee, Daejeon (KR); Seoung Bum Pyoun, Hwaseong-si (KR); Young-Jin Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,026

(22) Filed: Oct. 15, 2020

(65) Prior Publication Data

US 2021/0055849 A1  Feb. 25, 2021

Related U.S. Application Data

(63) Continuation of application No. 16/505,919, filed on Jul. 9, 2019, now Pat. No. 10,845,935, which is a
(Continued)

(30) Foreign Application Priority Data

Jan. 8, 2015 (KR) ........................ 10-2015-0002722

(51) Int. Cl.
*G06F 3/041* (2006.01)
*G06F 3/044* (2006.01)
(Continued)

(52) U.S. Cl.
CPC .......... *G06F 3/04184* (2019.05); *G06F 3/044* (2013.01); *G06F 3/047* (2013.01);
(Continued)

(58) Field of Classification Search
CPC ........... G06F 3/04184; G06F 3/041662; G06F 3/0443; G06F 3/0412; G06F 3/0418;
(Continued)

(56) References Cited

U.S. PATENT DOCUMENTS 8,884,917 B2  11/2014  Seo
8,913,017 B2  12/2014  Chang et al.
(Continued)

FOREIGN PATENT DOCUMENTS

CN  101882014  11/2010
CN  101882022  11/2010
(Continued)

OTHER PUBLICATIONS

Non-Final Office Action dated Dec. 28, 2017, in U.S. Appl. No. 15/798,712.
(Continued)

*Primary Examiner* — Ricardo Osorio
(74) *Attorney, Agent, or Firm* — H.C. Park & Associates, PLC

(57) ABSTRACT

A display device includes a display panel including pixels, an active area on which an image is configured to be displayed, and a black matrix area on which an image is not configured to be displayed, touch sensor electrodes configured to detect a touch of an external object, the touch sensor electrodes disposed in the active area, and detection input electrodes configured to generate mutual capacitance with the touch sensor electrodes, the detection input electrodes disposed in an edge area of the display panel that overlaps the black matrix area.

15 Claims, 15 Drawing Sheets

Related U.S. Application Data continuation of application No. 15/798,712, filed on Oct. 31, 2017, now Pat. No. 10,394,407, which is a continuation of application No. 14/730,980, filed on Jun. 4, 2015, now Pat. No. 9,817,538.

(51) Int. Cl.
*G06F 3/047* (2006.01)
*G09G 5/00* (2006.01)
*G09G 3/36* (2006.01)

(52) U.S. Cl.
CPC .......... *G06F 3/0412* (2013.01); *G06F 3/0418* (2013.01); *G06F 3/0443* (2019.05); *G06F 3/041662* (2019.05); *G09G 5/003* (2013.01); *G09G 3/3648* (2013.01); *G09G 2300/0426* (2013.01)

(58) Field of Classification Search
CPC ......... G06F 3/044; G06F 3/047; G09G 5/003; G09G 3/3648; G09G 2300/0426
See application file for complete search history.

(56) References Cited

U.S. PATENT DOCUMENTS

| | | | |
|---|---|---|---|
| 8,970,230 B2 | 3/2015 | Narayanasamy et al. | |
| 9,182,865 B2 | 11/2015 | Chae | |
| 9,201,259 B2 | 12/2015 | Kim et al. | |
| 9,218,080 B2 | 12/2015 | Oh et al. | |
| 9,256,327 B2 | 2/2016 | Salaverry et al. | |
| 9,342,177 B2 | 5/2016 | Seo et al. | |
| 9,436,334 B2 | 9/2016 | Kida et al. | |
| 9,588,627 B2 | 3/2017 | Noguchi et al. | |
| 9,817,538 B2* | 11/2017 | Lee | G09G 5/003 |
| 10,394,407 B2* | 8/2019 | Lee | G06F 3/0412 |
| 10,845,935 B2* | 11/2020 | Lee | G06F 3/0418 |
| 2010/0039406 A1* | 2/2010 | Lee | G06F 3/042 345/174 |
| 2010/0258360 A1 | 10/2010 | Yilmaz | |
| 2011/0175835 A1 | 7/2011 | Wang | |
| 2011/0291961 A1* | 12/2011 | Hsieh | G06F 3/0412 345/173 |
| 2012/0050333 A1 | 3/2012 | Bernstein | |
| 2012/0229408 A1 | 9/2012 | Yamamoto | |
| 2013/0027857 A1* | 1/2013 | Jeong | G02F 1/133528 361/679.01 |
| 2013/0154996 A1 | 6/2013 | Trend et al. | |
| 2014/0028616 A1 | 1/2014 | Furutani et al. | |
| 2014/0210752 A1 | 7/2014 | Katsuta | |
| 2014/0253499 A1 | 9/2014 | Lee et al. | |
| 2014/0267055 A1* | 9/2014 | Burrell | G06F 1/1692 345/169 |
| 2014/0313431 A1* | 10/2014 | Chang | G06F 3/041 349/12 |
| 2014/0354560 A1* | 12/2014 | Kim | G06F 3/0412 345/173 |
| 2014/0362031 A1 | 12/2014 | Mo et al. | |
| 2014/0368460 A1 | 12/2014 | Mo et al. | |
| 2015/0015517 A1 | 1/2015 | Zhao | |
| 2015/0029116 A1* | 1/2015 | Kim | G06F 3/0412 345/173 |
| 2015/0049044 A1 | 2/2015 | Yousefpor et al. | |
| 2015/0212548 A1 | 7/2015 | Namkung et al. | |
| 2015/0309634 A1* | 10/2015 | Lee | G06F 3/0418 345/173 |
| 2015/0331535 A1 | 11/2015 | Li et al. | |
| 2016/0103547 A1 | 4/2016 | Lu et al. | |
| 2016/0117014 A1 | 4/2016 | Davison et al. | |
| 2016/0132285 A1* | 5/2016 | Hawker | G06F 3/041 345/173 |
| 2017/0060310 A1* | 3/2017 | Gwon | G09G 3/3696 |

FOREIGN PATENT DOCUMENTS

| | | |
|---|---|---|
| CN | 102193231 | 9/2011 |
| CN | 102750060 | 10/2012 |
| CN | 103116431 | 5/2013 |
| CN | 103279245 | 9/2013 |
| CN | 103294323 | 9/2013 |
| CN | 103926728 | 7/2014 |
| JP | 2013-058262 | 3/2013 |
| JP | 2013-080425 | 5/2013 |
| JP | 2013-515302 | 5/2013 |
| JP | 2014-053000 | 3/2014 |
| JP | 2014-174760 | 9/2014 |
| JP | 2015-064854 | 4/2015 |
| KR | 10-2013-0035243 | 4/2013 |
| KR | 10-2013-0035833 | 4/2013 |
| KR | 10-2013-0044432 | 5/2013 |
| KR | 10-2014-0057707 | 5/2014 |
| WO | 2013145958 | 10/2013 |

OTHER PUBLICATIONS

Final Office Action dated Jul. 23, 2018, in U.S. Appl. No. 15/798,712.
Non-Final Office Action dated Dec. 13, 2018, in U.S. Appl. No. 15/798,712.
Notice of Allowance dated Apr. 10, 2019, in U.S. Appl. No. 15/798,712.
Non-Final Office Action dated Oct. 7, 2016, in U.S. Appl. No. 14/730,980.
Final Office Action dated May 4, 2017, in U.S. Appl. No. 14/730,980.
Notice of Allowance dated Jul. 12, 2017, in U.S. Appl. No. 14/730,980.
Chinese Office Action dated Sep. 17, 2019 regarding Chinese Patent Application No. 201510684029.0.
Non-Final Office Action dated Aug. 7, 2019, in U.S. Appl. No. 16/505,919.
Final Office Action dated Nov. 29, 2019, in U.S. Appl. No. 16/505,919.
Non-Final Office Action dated Apr. 7, 2020, in U.S. Appl. No. 16/505,919.
Notice of Allowance dated Jul. 16, 2020, in U.S. Appl. No. 16/505,919.

* cited by examiner

DISPLAY DEVICE INCLUDING TOUCH SENSOR

CROSS-REFERENCE TO RELATED APPLICATIONS

This application is a Continuation of U.S. patent application Ser. No. 16/505,919, filed on Jul. 9, 2019, which is a Continuation of U.S. patent application Ser. No. 15/798,712, filed on Oct. 31, 2017, issued as U.S. Pat. No. 10,394,407, which is a Continuation of U.S. patent application Ser. No. 14/730,980, filed on Jun. 4, 2015, issued as U.S. Pat. No. 9,817,538, and claims priority from and the benefit of Korean Patent Application No. 10-2015-0002722, filed on Jan. 8, 2015, each of which is incorporated by reference for all purposes as if fully set forth herein.

BACKGROUND

Field

Exemplary embodiments of the present invention relate to a display device including a touch sensor.

Discussion of the Background

A flat panel display (FPD), such as a liquid crystal display (LCD), an organic light emitting diode (OLED) display, and an electrophoretic display (EPD) may include field generating electrodes and an electro-optical active layer. The liquid crystal display may include a liquid crystal layer as the electro-optical active layer, the organic light emitting diode display may include an organic emission layer as the electro-optical active layer, and the electrophoretic display may include particles having charges as the electro-optical active layer. The field generating electrode may be connected to a switching element, such as a thin-film transistor, to receive a data signal, and the electro-optical active layer may display an image by converting the data signal into an optical signal.

The flat panel display may have a touch detecting function to interact with a user, in addition to an image displaying function. The touch detecting function may detect a change in pressure, charge, light, and the like applied to a screen by a display device when a user touches the screen with a finger, a touch pen, or the like, and recognize whether an object touched the screen and touch information about a touch position and the like. The display device may receive an image signal based on the touch information.

The touch detecting function may be implemented through a sensor. The sensor may be classified into various types, such as a resistive type, a capacitive type, an electromagnetic (EM) type, and an optical type.

Among the sensors, the capacitive type sensor may include a detection capacitor having a detecting electrode that may transmit a detection signal. The capacitive type sensor may detect a change in capacitance of the detection capacitor that is generated when a conductor, such as a finger, approaches the sensor, to detect a contact, a contact position, and the like.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a method to prevent a coupling noise of a touch sensor.

Exemplary embodiments of the present invention also provide a method to improve a touch characteristic at an edge area of a display device.

Additional aspects will be set forth in the detailed description which follows, and, in part, will be apparent from the disclosure, or may be learned by practice of the inventive concept.

According to an exemplary embodiment of the present invention, a display device includes pixels, an active area on which the image is configured to be displayed, and a black matrix area on which an image is not configured to be displayed, touch sensor electrodes configured to detect a touch of an external object, the touch sensor electrodes disposed in the active area, and detection input electrodes configured to generate mutual capacitance with the touch sensor electrodes, the detection input electrodes disposed in an edge area of the display panel that overlaps the black matrix area.

The touch sensor electrode may be configured to detect the touch of the external object by at least one of a self-capacitance type and a mutual-capacitance type.

The display device may further include a detection scan driver connected to the display panel, detection input signal lines electrically connected to the touch sensor electrodes and the detection input electrodes, the detection input signal lines configured to receive a detection input signal from the detection scan driver and transmit the received detection input signal to the touch sensor electrodes and the detection input electrodes, a detection signal processor connected to the display panel, and detection output signal lines electrically connected with the touch sensor electrodes, in which the detection output signal lines are configured to receive detection output signals from the touch sensor electrodes and transmit the received detection output signals to the detection signal processor.

The touch sensor electrodes may be configured to transmit a first detection output signal generated by the self-capacitance type to the detection signal processor through a first detection output signal line, and a second detection output signal generated by the mutual-capacitance type to the detection signal processor through a second detection output signal line.

The detection signal processor may be configured to extract touch coordinates by using at least one of a first detection output signal generated by the touch sensor electrode by the self-capacitance type and a second detection output signal generated by the touch sensor electrode by the mutual-capacitance type.

The detection signal processor may be configured to extract the touch coordinates by combining the first detection output signal and the second detection output signal.

The detection signal processor may be configured to calculate an average value of a value of the first detection output signal and a value of the second detection output signal, combine the first and second detection output signals for each position of the touch sensor electrode, and extract the touch coordinates by performing interpolation on the combined signal based on the average value.

The detection signal processor may be configured to extract first touch coordinates by performing interpolation on the first detection output signal, second touch coordinates by performing the interpolation on the second detection output signal, and the touch coordinates based on an average value of the first touch coordinates and the second touch coordinates.

The display device may further include a touch sensor controller connected to the display panel, and detection signal lines may be electrically connected with the touch sensor electrodes and the detection input electrodes, in which the detection signal lines are configured to receive a detection input signal from the touch sensor controller and transmit the received detection input signal to the touch sensor electrodes and the detection input electrodes, and receive detection output signals from the touch sensor electrodes and transmit the received detection output signal to the touch sensor controller.

The touch sensor electrode may be configured to transmit a first detection output signal generated by the self-capacitance type to the touch sensor controller through a first detection signal line, and a second detection output signal generated by the mutual-capacitance type to the touch sensor controller through a second detection signal line.

The display panel may include a first substrate and a second substrate facing the first substrate, touch sensor layers on which the touch sensor electrodes is disposed, and a common electrode disposed on the second substrate with an insulating layer interposed therebetween, in which the touch sensor electrode may be configured to detect a touch of an object on an upper surface of the second substrate, the detection input electrodes may be disposed on the second.

The display panel may include a first substrate, a second substrate, a static electricity preventing layer disposed on an upper surface of the second substrate, and touch sensor layers, on which the touch sensor electrodes are disposed, and the detection input electrodes may be disposed on the static electricity preventing layer with an adhesive layer interposed therebetween.

The display panel may include a first substrate, a second substrate, a static electricity preventing layer disposed on an upper surface of the second substrate, and touch sensor layers on which the touch sensor electrodes are formed, and the detection input electrodes may be disposed on the static electricity preventing layer with a passivation layer interposed therebetween.

The display panel may include a first substrate, a second substrate, a static electricity preventing layer disposed on an upper surface of the second substrate, and the touch sensor electrodes and the plurality of detection input electrodes may be disposed on the static electricity preventing layer.

The display panel may include a first substrate, a second substrate, touch sensor layers on which the touch sensor electrodes are disposed, and the detection input electrodes.

Detection signal lines disposed on the touch sensor layers may be connected to the first substrate through conductive dots.

According to an exemplary embodiment of the present invention, a method of detecting a touch in a display device includes obtaining a first detection output signal generated by a self-capacitance type from touch sensor electrodes, obtaining a second detection output signal generated by a mutual-capacitance type from the touch sensor electrodes and extracting touch coordinates by combining the first detection output signal and the second detection output signal.

Extracting the touch coordinates may include calculating an average value of a value of the first detection output signal and a value of the second detection output signal, combining the first and second detection output signals for each position of the touch sensor electrodes, and extracting the touch coordinates by performing interpolation on the combined signal based on the average value.

Extracting the touch coordinates may include extracting first touch coordinates by performing interpolation on the first detection output signal, extracting second touch coordinates by performing the interpolation on the second detection output signal, and extracting the touch coordinates based on an average value of the first touch coordinates and the second touch coordinates.

According to the exemplary embodiments of the present invention, the touch sensor in the display device may prevent generation of a coupling noise, and improve a touch characteristic at an edge area of the display device.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
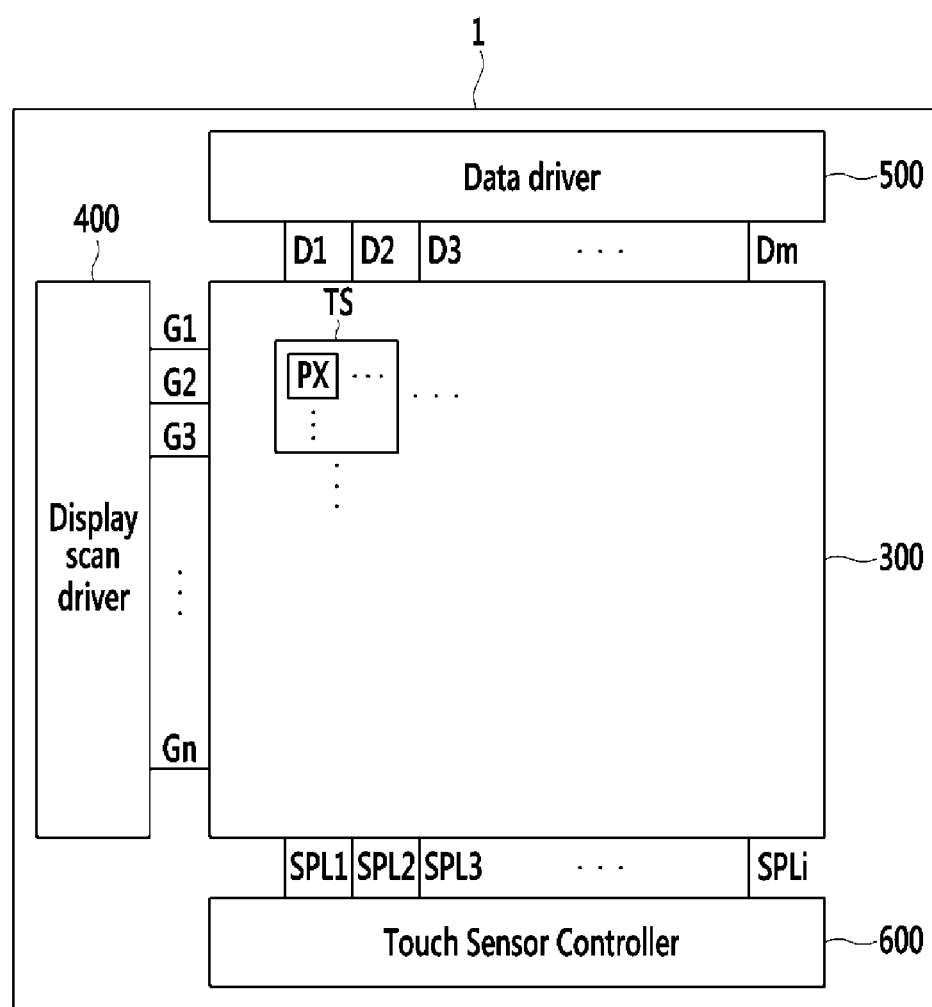
FIGS. 1 to 3 are schematic layout views of a display device including a touch sensor according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A display device including a touch sensor according to an exemplary embodiment of the present invention will be described in detail with reference to the accompanying drawings. Hereinafter, exemplary embodiments of the present invention are described in relation to a liquid crystal display, however, exemplary embodiments of the present invention may be applicable to other types of display devices, such as an OLED display and an EPD.

A capacitive type sensor may generate a coupling noise with an internal circuit of a display device, depending on a structure of the sensor structure in the display device, which may deteriorate touch characteristics at an edge portion of the display device.

Figure 2:
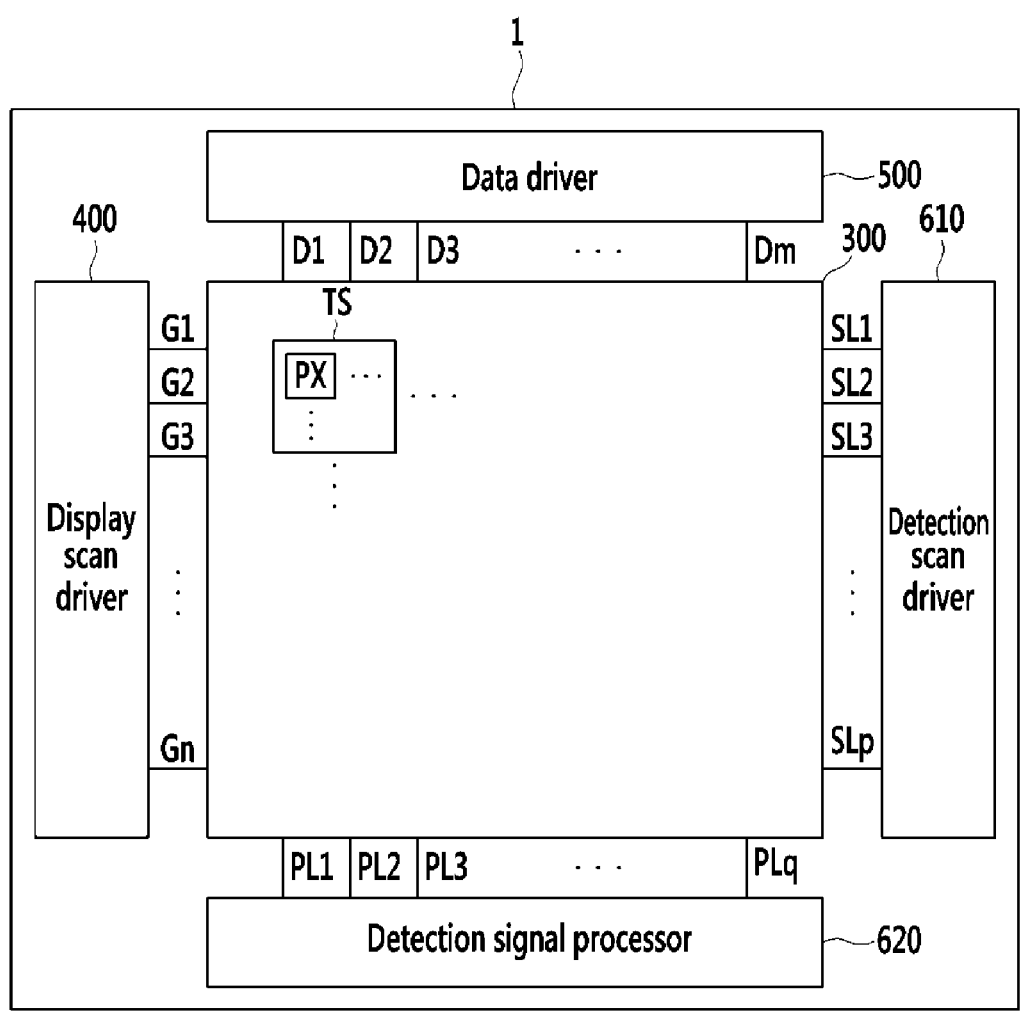
Figure 3:
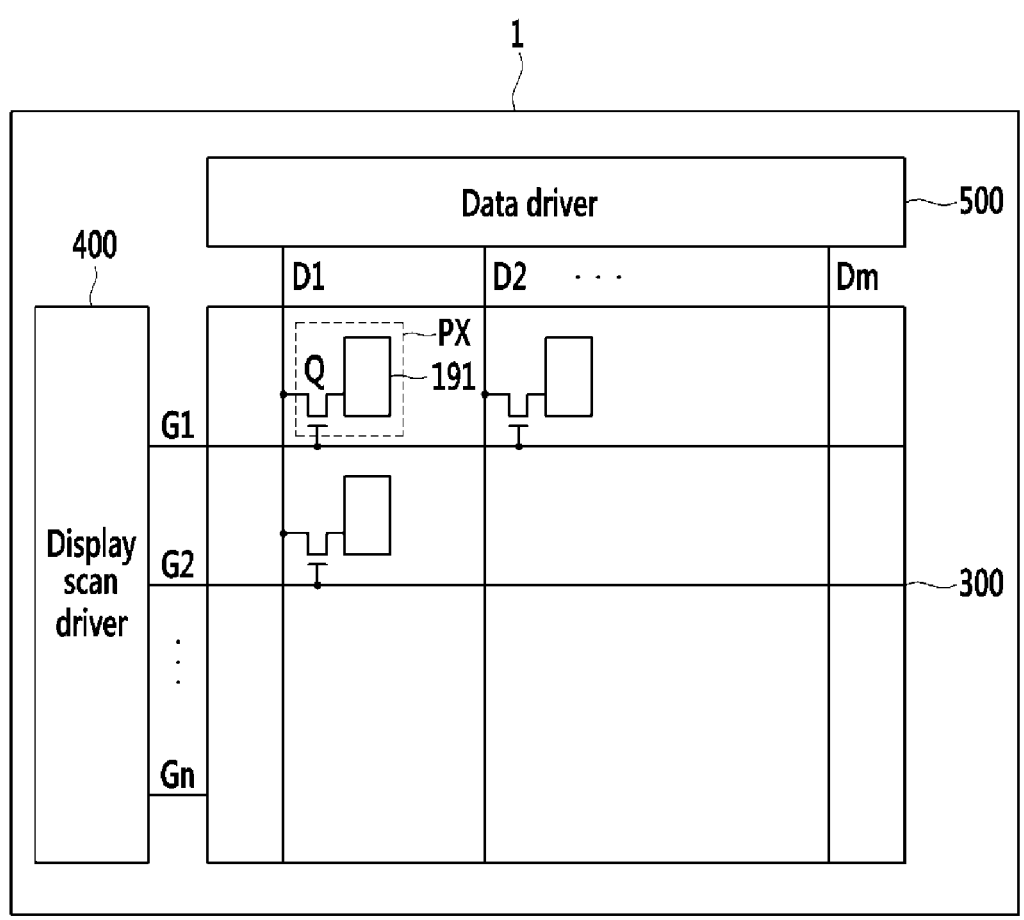

FIGS. 1 to 3 are schematic layout views of a display device including a touch sensor according to an exemplary embodiment of the present invention.

Referring to FIG. 1, a display device 1 including a touch sensor according to an exemplary embodiment of the present invention includes a display panel 300 including touch sensors TS, a display scan driver 400, a data driver 500, and a touch sensor controller 600.

The display device 1 includes an active area (AA) displaying an image, and a black matrix area (BM) corresponding to a non-active area arranged on a remaining area of the display device 1 that may not overlap the active area AA.

The display panel 300 is connected to scan signal lines (G1 to Gn), data lines (D1 to Dm), and detection signal lines (SPL1 to SPLi). Further, the display panel 300 includes touch sensors TS connected to the detection signal lines (SPL1 to SPLi) and pixels PX arranged in a matrix form to display an image.

The detection signal lines (SPL1 to SPLi) may extend substantially along a row direction or a column direction, and be connected to the touch sensors TS, respectively, to transmit detection input signals and detection output signals.

The detection input signal may have various waveforms and voltage levels. For example, the detection input signal may include a periodical output pulse, and include two or more different voltage levels. The detection input signal may also be an alternating current (AC) voltage that may vary based on a predetermined voltage level.

The detection input signal input into each touch sensor TS and the detection output signal output from each touch sensor TS may be transmitted through each of the detection input signal lines (SL1 to SLp) and each of the detection output signal lines (PL1 to PLq) as illustrated in FIG. 2.

FIG. 2 illustrates transmitting the detection input signal and the detection output signal through separate signal lines. The detection input signal lines (SL1 to SLp) may be connected to the detection scan driver 610 and extend substantially parallel to each other. The detection input signal lines (SL1 to SLp) may transmit the detection input signal received from the detection scan driver 610.

The detection output signal lines (PL1 to PLq) may be connected to a detection signal processor 620 and extend substantially parallel to each other to cross the detection input signal lines (SL1 to SLp). A predetermined reference voltage may be applied to the detection output signal lines (PL1 to PLq), and the detection output signal lines (PL1 to PLq) may transmit the detection output signal generated by the touch sensor TS to the detection signal processor 620, according to a touch to the display panel 300.

The scan signal lines (G1 to Gn) may extend substantially in the row direction and transmit a gate signal including a combination of a gate-on voltage and a gate-off voltage that may turn on and off a switching element Q, such as a thin-film transistor, connected to each pixel PX.

The data lines (D1 to Dm) may extend substantially in the column direction, and transmit a data voltage when the switching element Q connected to each pixel PX is turned on.

The pixel PX is a unit of displaying an image. One pixel PX may display one of primary colors, or the pixels may alternately display the primary colors according to a predetermined time to display a desired color with a spatial or temporal sum of the primary colors. A common voltage and the data voltage may be applied to each pixel PX.

Referring to FIG. 3, each pixel PX may include the switching element Q, such as a thin-film transistor, connected to the scan signal lines (G1 to Gn) and the data lines (D1 to Dm), and a pixel electrode 191 connected to the switching element Q.

The touch sensor TS may be capacitive type that may generate the detection output signal according to a contact. One touch sensor TS may be positioned in a portion in which one detection input signal line (SL1 to SLp) and one detection output signal line (PL1 to PLq) cross.

The pixels PX may be positioned in an area of one touch sensor TS. For example, several tens or hundreds of pixel PX columns may be disposed in the row direction or the column direction in the area of one touch sensor TS. A density of the pixels PX corresponding to one touch sensor TS may vary according to a resolution of the display device.

The touch sensor TS may also generate the detection output signal in a self-capacitance type according to a touch. The touch sensor TS may receive the detection input signal from the detection signal lines (SPL1 to SPLi), and output a capacitance change by a touch of an external object, such as a finger, as the detection output signal through the detection signal lines (SPL1 to SPLi).

In addition, the touch sensor TS may receive the detection input signal from the detection input signal lines (SL1 to SLp), and output a capacitance change by a touch of an external object, such as a finger, as the detection output signal through the detection output signal lines (PL1 to PLq).

The touch sensor controller 600 generates a detection scan signal configured to be applied to the touch sensor TS and transmits the generated detection scan signal. The touch sensor controller 600 may also generate touch information based on the detection output signal received from the touch sensor TS.

The detection scan driver 610 is connected to the detection input signal lines (SL1 to SLp) of the display panel 300 to apply the detection input signal to the detection input signal lines (SL1 to SLp). In this case, the detection input signal may be sequentially applied to the detection input signal lines (SL1 to SLp).

The detection signal processor 620 is connected with the detection output signal lines (PL1 to PLq) of the display panel 300, receives the detection output signal from the detection output signal lines (PL1 to PLq), and processes the received detection output signals. The detection signal processor 620 may generate contact information, such as whether a touch is made and a touch position, by using the processed detection output signal.

The touch sensor controller 600 may include a detection scan driver 610 and a detection signal processor 620.

The display scan driver 400 is connected to the scan signal lines (G1 to Gn) of the display panel 300 and applies the gate signal to the scan signal lines (G1 to Gn).

The data driver 500 is connected to the data lines (D1 to Dm) of the display panel 300, and applies the data voltage corresponding to the input image signal to the data lines (D1 to Dm).

Figure 4:
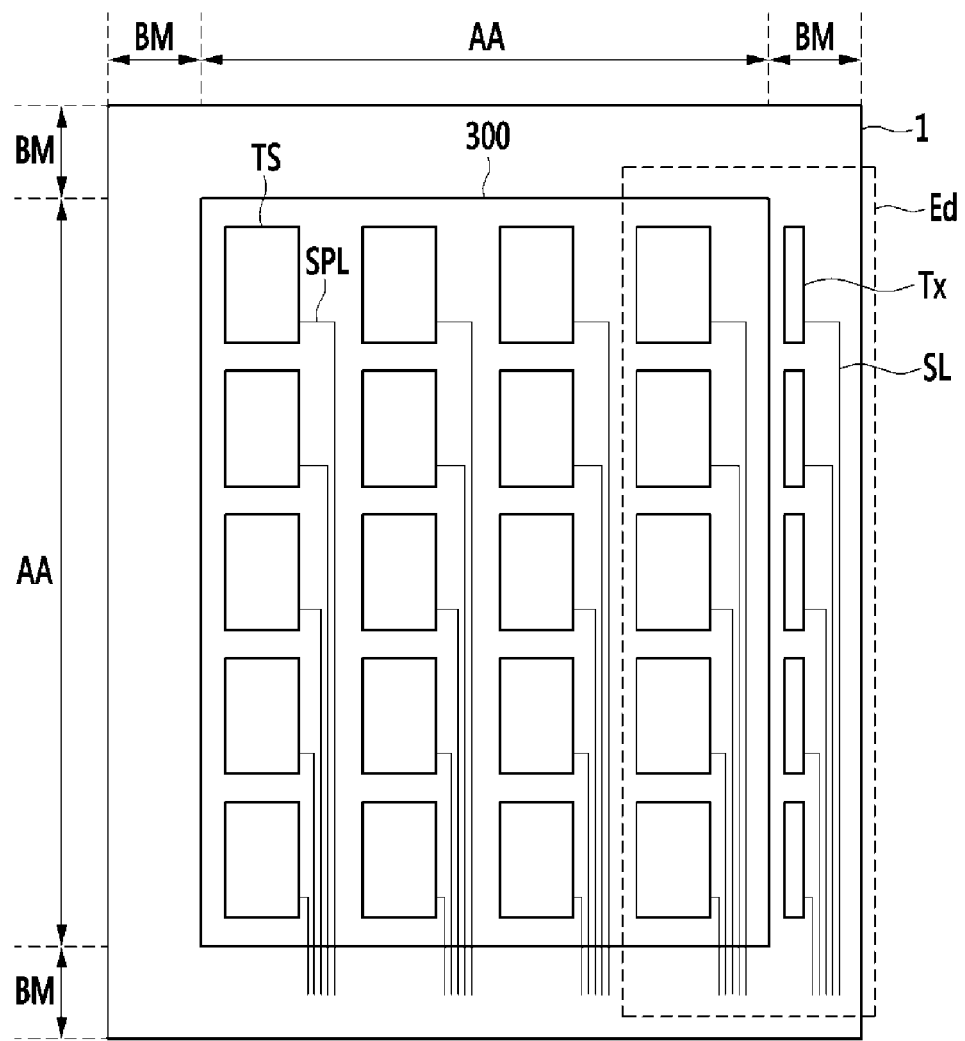
FIG. 4 is a top plan view of a display device illustrating a pattern of the touch sensor according to an exemplary embodiment of the present invention.
Figure 5:
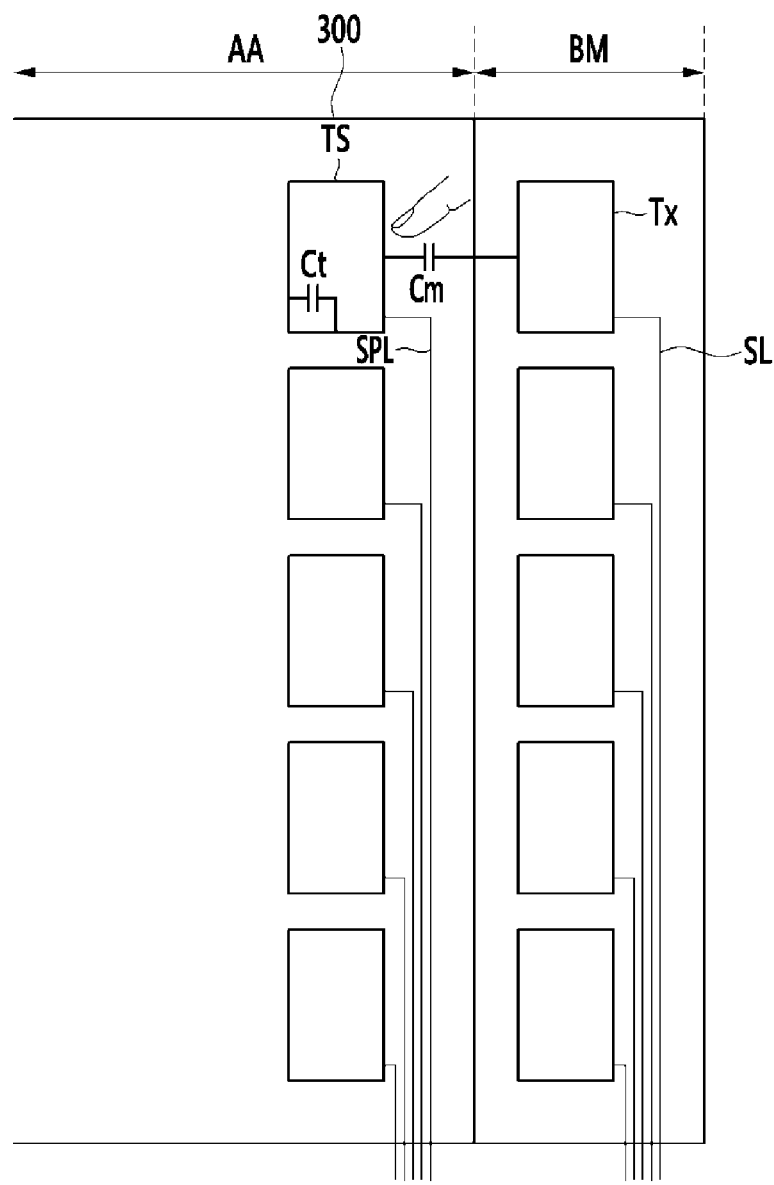
FIG. 5 is a top plan view illustrating an edge area Ed of a display panel according to an exemplary embodiment of the present invention.
Figure 6:
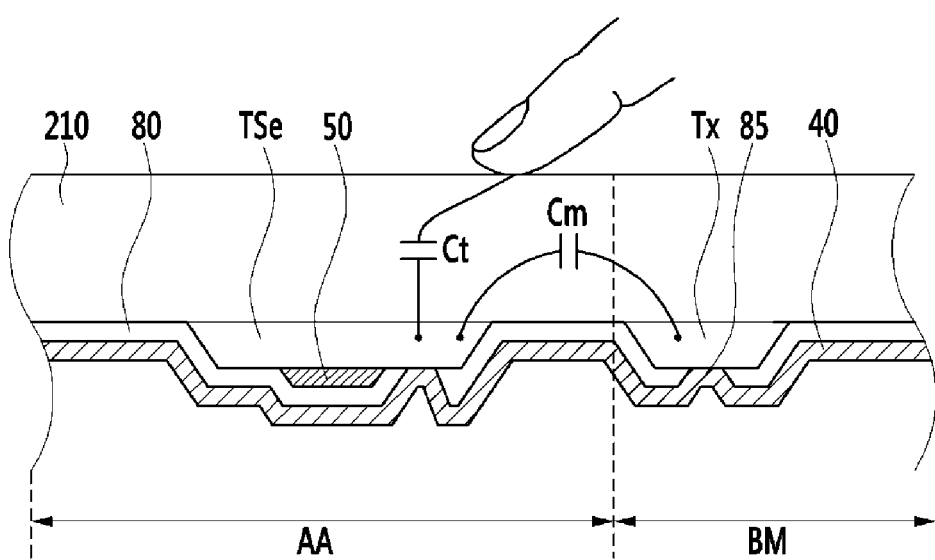
FIG. 6 is a cross-sectional view of the edge area of a display panel according to an exemplary embodiment of the present invention.

FIG. 4 is a top plan view of the display device illustrating a pattern of the touch sensor according to an exemplary embodiment of the present invention, and FIG. 5 is a top plan view illustrating an edge area Ed of the display panel 300. FIG. 6 is a cross-sectional view of the edge area Ed of the display panel 300.

Referring to FIG. 4, touch sensors TS may be arranged in the matrix form and be formed of a transparent conductive material, such as an indium tin oxide (ITO), indium zinc oxide (IZO), and carbon nanotube (CNT). The touch sensor TS may have various shapes, such as a quadrangle, a triangle, and a circle, and a size of several mm. For example, when the touch sensor TS has a quadrangular shape, a length of one side may be about 3 to 5 mm. The size of the touch sensor TS may vary according to an area of a contact when an object touches to the display panel 300.

The touch sensor TS and the detection signal line SPL connected to the touch sensor TS may be formed of the same material by patterning. For example, the touch sensors TS and the detection signal lines SPL may be simultaneously formed by using one mask by stacking and patterning one ITO layer.

Referring to FIG. 4, the touch sensors TS are arranged in the display panel 300, and the detection signal lines SPL may be connected to the touch sensors TS. In the BM area, detection input electrodes Tx may be arranged along the column direction in the BM area, and the detection input signal lines SL may be connected to the detection input electrodes Tx. An edge area Ed may an area around a boundary between the active area AA and the BM area.

Referring to FIGS. 5 and 6, when an external object touches the edge area Ed of the display panel 300, capacitance Ct generated between a touch sensor electrode TSe inside the touch sensor TS and the external object may be varied, and the detection output signal according to the varied capacitance Ct may be output to the detection signal line SPL. Further, when the external object touches the edge area Ed of the display panel 300, a charge quantity charged in a detection capacitor Cm between the touch sensor electrode TSe inside the touch sensor TS and the detection input electrode Tx may be varied, and the detection output signal according to the varied charge quantity may be output to the detection signal line SPL.

When the external object touches the edge area Ed of the display panel 300, the detection output signals generated by the self-capacitance type and a mutual-capacitance type, respectively, may be output to the detection signal lines SPL. The detection output signal generated by the self-capacitance type and the detection output signal generated by the mutual-capacitance type may be output to one detection signal line SPL, but may also be output to the separate detection signal lines SPL or the separate detection output signal lines PL.

The touch sensor controller 600 may obtain a touch signal of the edge area Ed of the display panel 300 by using the detection output signal by the self-capacitance type and obtain a touch signal of the edge area Ed of the display panel 300 by using the detection output signal by the mutual-capacitance type to extract touch coordinates of the edge area Ed of the display panel 300 by combining the two touch signals.

When the touch sensors TS or detection output electrodes Rx are arranged in the BM area to improve a touch characteristic of the edge area Ed of the display panel 300, a coupling noise may be generated with a peripheral circuit arranged at the BM area. The peripheral circuit may be the display scan driver 400, the data driver 500, the touch sensor controller 600, the detection scan driver 610, the detection signal processor 620, and the like.

According to an exemplary embodiment of the present invention, the detection input electrodes Tx are arranged in the BM area. When a touch in the edge area Ed of the display panel 300 is detected by using mutual-capacitance between the detection input electrode Tx and the touch sensor electrode TSe inside the touch sensor TS, a touch detection performance may be improved than where the touch in the edge area Ed of the display panel 300 is detected by using only self-capacitance of the touch sensor TS.

According to an exemplary embodiment of the present invention, when there is a contact of an external object in the remaining area except for the edge area Ed of the display panel 300, touch coordinates may be extracted by generating the detection output signal by only the self-capacitance type using capacitance Ct generated between the touch sensor electrode TSe inside the touch sensor TS and the external object.

Referring to FIG. 6, the display device 1 including the touch sensor according to an exemplary embodiment of the present invention includes an upper substrate 210, which is an insulating substrate that provides a contact surface. The touch sensor electrodes TSe and the detection input electrodes Tx are positioned under the upper substrate 210 that is the insulating substrate.

The detection input electrodes Tx may be arranged in the column direction to form one detection input electrode column. The detection input electrodes Tx positioned in one detection input electrode column may be connected to each other. Each detection input electrode Tx may have a quadrangle shape as illustrated in FIG. 5, or have various shapes. A length of one side of each detection input electrode Tx may be about several mm, but may vary according to a contact object and a contact method.

The touch sensor electrode TSe forms mutual-capacitance between the detection input electrodes Tx to serve substantially the same role as the detection output electrode Rx. The touch sensor electrode TSe and the detection input electrode Tx may be positioned on the same plane under the upper substrate 210 that is the insulating substrate, or positioned on different layers.

The detection input electrode Tx may be formed of a transparent conductive material, such as an indium tin oxide (ITO) or an indium zinc oxide (IZO).

Referring to FIG. 6, the detection input electrode Tx is electrically connected with the detection input signal line 40 (SL) connected to the touch sensor controller 600 or the detection scan driver 610, and the touch sensor electrode TSe is electrically connected with the detection output signal line 50 (SPL and PL) connected to the touch sensor controller 600 or the detection signal processor 620.

The detection input signal line 40 and the detection output signal line 50 may be positioned on different layers. For example, as illustrated in FIG. 6, the detection input signal line 40 may be positioned under the detection output signal line 50, or over the detection output signal line 50. Hereinafter, the detection input signal line 40 will be described as being positioned under the detection output signal line 50 with respect to the upper substrate 210 that is the insulating substrate, as illustrated in FIG. 6.

The detection output signal line 50 may be positioned under the touch sensor electrode TSe. The detection output signal line 50 may be elongated in the column direction, and each detection output signal line 50 may be in direct contact with and connected to one touch sensor electrode TSe. The detection output signal line 50 may transmit the detection output signal to the touch sensor controller 600 or the detection signal processor 620.

An insulating layer 80 is positioned under the detection output signal lines 50. The insulating layer 80 may include an organic insulating material or an inorganic insulating material. The insulating layer 80 may include contact holes 85 for exposing the touch sensor electrode TSe and the detection input electrode Tx.

The detection input signal lines 40 may be positioned under the insulating layer 80. The detection input signal lines 40 may be elongated in the row direction and electrically connected to the touch sensor electrode TSe and the detection input electrode Tx through the contact holes 85. The touch sensor electrodes TSe and the detection input electrodes Tx may be electrically connected to each other through one detection input signal line 40, and the touch sensor electrodes TSe and the detection input electrodes Tx may be connected to separate detection input signal lines 40, respectively. The same detection input signal input from the touch sensor controller 600 or the detection scan driver 610 through the respective detection input signal lines 40 may be transmitted to the touch sensors TS and the detection input electrodes Tx arranged in the row direction.

When an external object touches the upper substrate 210 that is the insulating substrate in the edge area Ed of the display panel 300, capacitance Ct generated between the external object and the touch sensor electrode TSe may be varied, and an output detection signal according to the capacitance variation may be transmitted to the touch sensor controller 600 or the detection signal processor 620 through the detection output signal line 50. Further, capacitance Cm between the touch sensor electrode TSe and the detection input electrode Tx may be varied, and thus an output detection signal may be transmitted to the touch sensor controller 600 or the detection signal processor 620 through the detection output signal line 50.

The output detection signal generated by the self-capacitance type and the output detection signal generated by the mutual-capacitance type may be transmitted to the touch sensor controller 600 or the detection signal processor 620 through the same detection output signal line 50, but may also be transmitted through the separate detection output signal lines 50, respectively.

When the detection input signal line 40 and the detection output signal line 50 are opaque, the detection input signal line 40 and the detection output signal line 50 may be hidden by a light blocking member (not illustrated).

Figure 7:
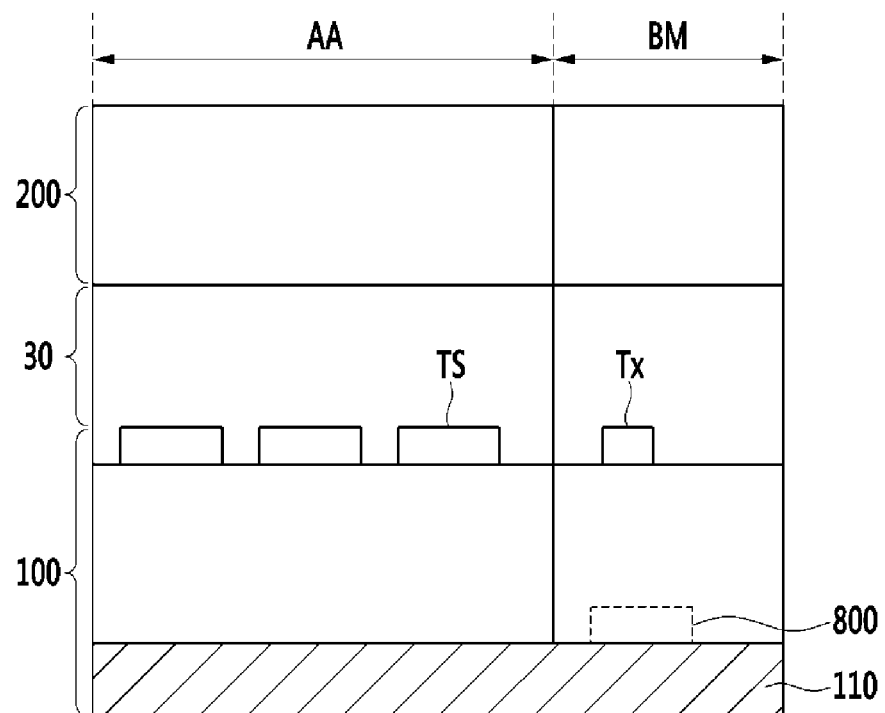
FIGS. 7 and 8 are cross-sectional views illustrating schematic configurations of display devices according to exemplary embodiments of the present invention.
Figure 8:
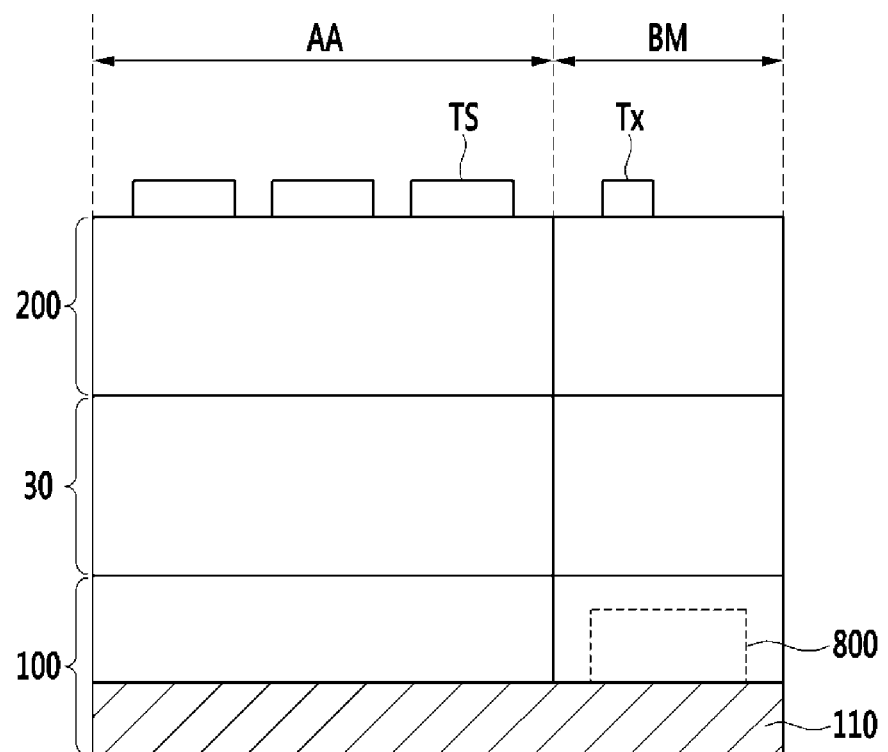

FIGS. 7 and 8 are cross-sectional views illustrating schematic configurations of display devices according to exemplary embodiments of the present invention.

Schematic configurations of display devices 1 including touch sensors according to an exemplary embodiment of the present invention will be described with reference to FIGS. 7 and 8. FIG. 7 is a display device including an in-cell type touch sensor, and FIG. 8 is a display device including an on-cell type touch sensor.

A display device 1 including a touch sensor includes a first substrate 100, a second substrate 200 disposed to face each other, and a liquid crystal layer 30 interposed therebetween. A driving method of the liquid crystal layer 30 may vary.

When an external object is in contact with an upper surface of the second substrate 200, the first substrate 100 may be a lower panel and the second substrate 200 may be an upper panel. A peripheral circuit 800 may be embedded in a BM area of the first substrate 100 including a lower substrate 110 that is an insulating substrate.

Referring to FIG. 7, touch sensors TS may be positioned in an active area AA of the first substrate 100 and detection input electrodes Tx may be positioned in the BM area. The touch sensors TS and the detection input electrodes Tx may be positioned on the first substrate 100, or on the second substrate 200. Further, the touch sensors TS and the detection input electrodes Tx may be positioned on the same layer or on the different layers.

Referring to FIG. 8, touch sensors TS may be positioned in an active area AA on a second substrate 200, and detection input electrodes Tx may be positioned in a BM area. The touch sensors TS and the detection input electrodes Tx may be positioned on the same layer or on the different layers.

Figure 9:
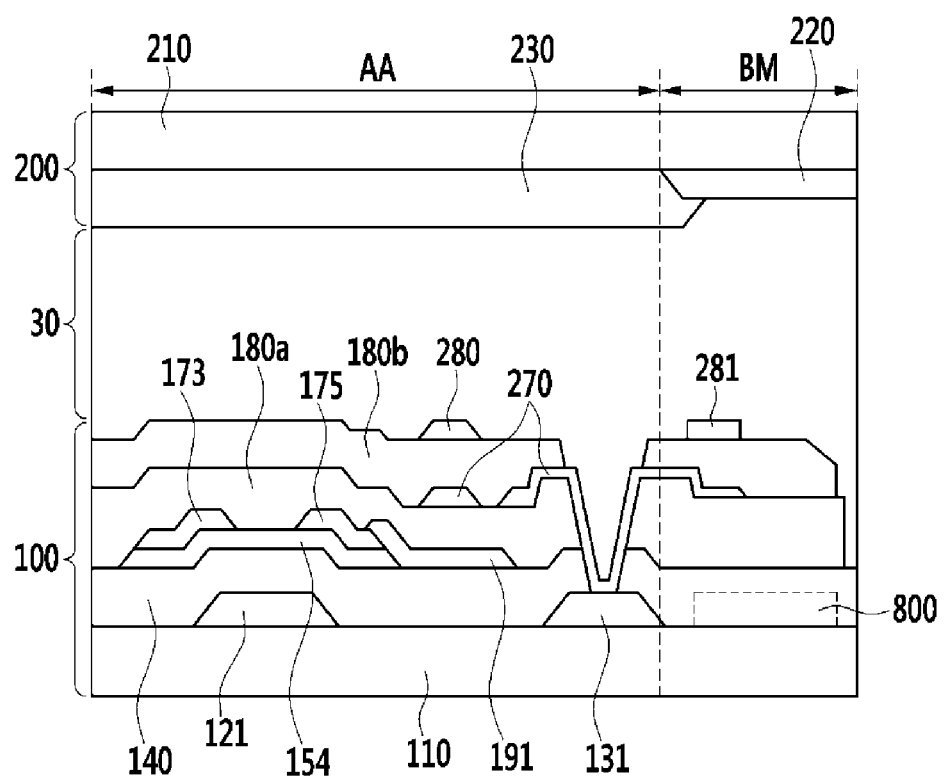
FIG. 9 is a cross-sectional view of a display device including a touch sensor according to an exemplary embodiment of the present invention.

FIG. 9 is a cross-sectional view of a display device including a touch sensor according to an exemplary embodiment of the present invention.

Referring to FIG. 9, a display device including a touch sensor according to an exemplary embodiment of the present invention may include a first substrate 100, a second substrate 200, and a liquid crystal layer 30. When an external object is in contact with an upper surface of the second substrate 200, the first substrate 100 may be a lower panel and the second substrate 200 may be an upper panel.

The display device includes stacked layers disposed on a lower substrate 110 that is a transparent insulating substrate and on an upper substrate 210. An upper surface of the upper substrate 210 may provide a touch surface on which a touch is made from the outside. The lower substrate 110 and the layers stacked on the lower substrate 110 may configure the first substrate 100, and the upper substrate 210 and the layers stacked on the upper substrate 210 may configure the second substrate 200. A liquid crystal display includes the liquid crystal layer between the first substrate 100 and the second substrate 200.

The first substrate 100 may include gate conductors including a gate line 121 and a common voltage line 131 positioned on the lower substrate 110. The gate conductor may be made of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), tantalum (Ta), and titanium (Ti). Alternatively, the gate conductor may have a multilayer structure including a conductive layer having two or more physical properties.

A peripheral circuit 800 may be positioned in a BM area on the lower substrate 110. The peripheral circuit 800 may include a display scan driver 400, a data driver 500, a touch sensor controller 600, a detection scan driver 610, a detection signal processor 620, and the like.

A gate insulating layer 140 formed of silicon nitride (SiNx) is positioned on the gate conductors. The gate insulating layer 140 may have a multilayer structure including at least two insulating layers having different physical properties.

A semiconductor 154 formed of hydrogenated amorphous silicon (a-Si) or polycrystalline silicon (poly-Si) is positioned on the gate insulating layer 140.

Data conductors including a source electrode 173 and a drain electrode 175 is positioned on the semiconductor 154. The semiconductor 154, and the gate line 121, the source electrode 173, and the drain electrode 175 overlapping the semiconductor 154 form a thin-film transistor.

A pixel electrode 191 is positioned on the drain electrode 175 and the gate insulating layer 140. The pixel electrode 191 is in contact with a part of the drain electrode 175. The pixel electrode 191 may be made of a transparent conductive material, such as ITO or IZO.

A first passivation layer 180a is positioned on the thin-film transistor and the pixel electrode 191. The first passivation layer 180a may include an inorganic insulation material, such as a silicon nitride (SiNx) and a silicon oxide (SiOx), or an organic insulation material. A contact hole for exposing the common voltage line 131 may be formed in the first passivation layer 180a and the gate insulating layer 140.

A common electrode 270 is positioned on the first passivation layer 180a. The common electrode 270 may receive a common voltage Vcom from a common voltage line 131 through the contact hole. The common electrode 270 may be made of a transparent conductive material, such as ITO and IZO.

A second passivation layer 180b is positioned on the common electrode 270. The second passivation layer 180b may include the same material as that of the first passivation layer 180a.

A touch sensor layer 280 is positioned in an active area AA on the second passivation layer 180b. The touch sensor layer 280 includes a touch sensor TS including a touch sensor electrode TSe.

A detection input electrode 281 is positioned in the BM area on the second passivation layer 180b. The detection input electrode Tx may be formed of a transparent conductive material, such as an indium tin oxide (ITO) or an indium zinc oxide (IZO).

The second substrate 200 may include a light blocking member 220 and a color filter 230 positioned on the upper substrate 210. The light blocking member 220 may be a black matrix that prevents light leakage. The color filter 230 may be disposed in substantial portion of an area surrounded by the light blocking member 220, and the area may be defined as a pixel area through which light passes. At least one of the color filter 230 and the light blocking member 220 may also be positioned on the first substrate 100.

The liquid crystal layer 30 may be positioned between the first substrate 100 and the second substrate 200. The pixel electrode 191 receiving a data voltage may generate an electric field in the liquid crystal layer 30 together with the common electrode 271 receiving the common voltage Vcom. The liquid crystal layer 30 of the display device according to an exemplary embodiment of the present invention includes liquid crystal molecules (not illustrated), and the liquid crystal molecules may be aligned so that longitudinal axes thereof are horizontal to surfaces of the two substrates 100 and 200 in a state where there is no electric field.

FIGS. 10 to 14 are cross-sectional views of display devices including the touch sensors according to exemplary embodiments of the present invention.

Figure 10:
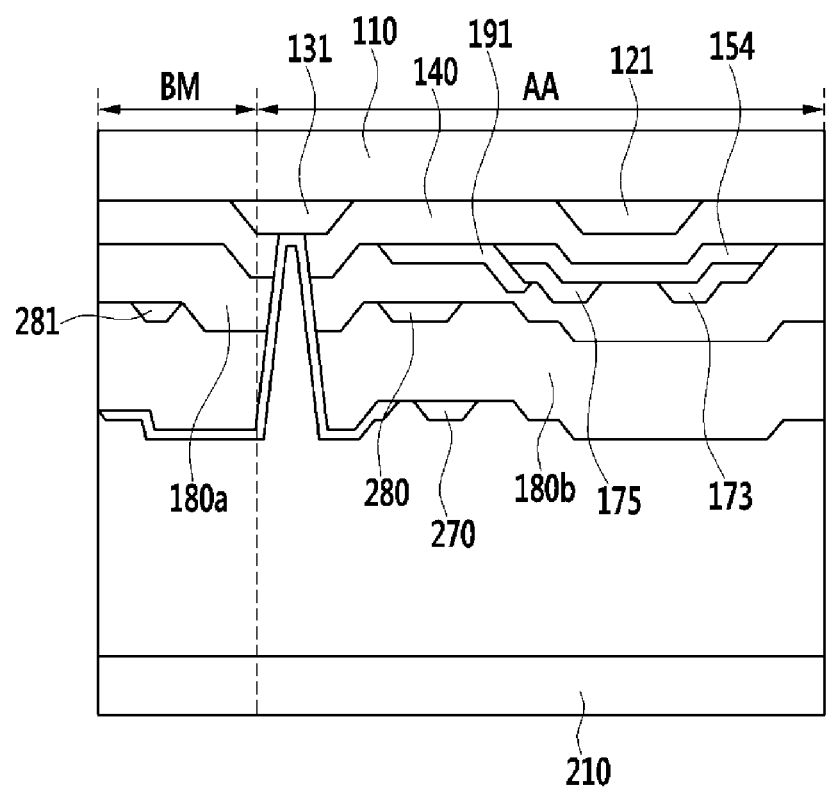
FIGS. 10 to 14 are cross-sectional views of display devices including the touch sensors according to exemplary embodiments of the present invention.

A display device of FIG. 10 may have substantially the same structure as the display device illustrated in FIG. 9 turned upside down, but positions of a common electrode 270, a touch sensor layer 280, and a detection input electrode 281 may vary. More particularly, the touch sensor layer 280 and the detection input electrode 281 are positioned to be closer to the substrate 110 than the common electrode 270. In this case, the touch sensor detects an object touching an upper surface of a substrate 110.

FIGS. 11 to 14 illustrate a structure of a touch sensor according to exemplary embodiments of the present invention.

Figure 11:
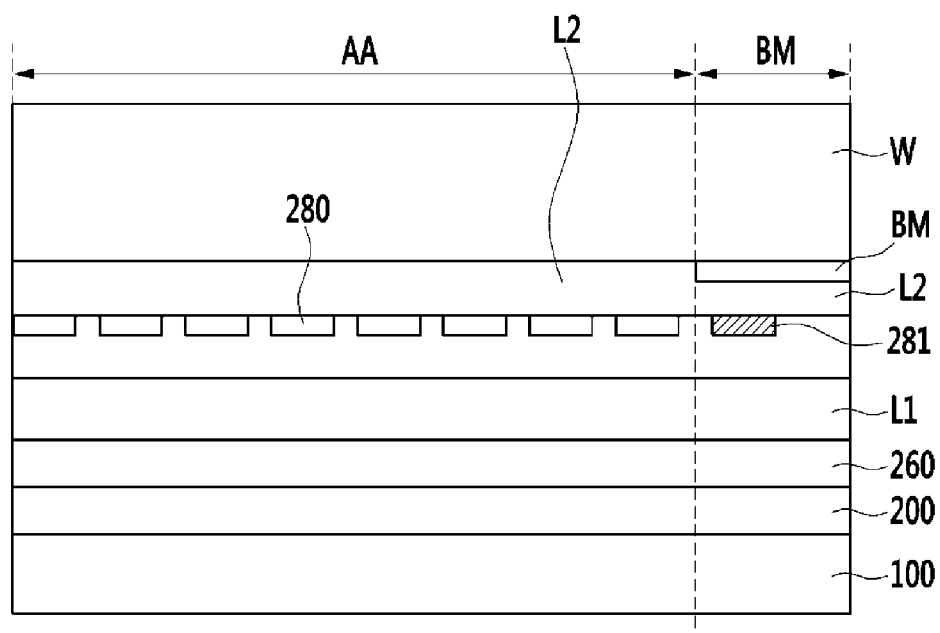

Referring to FIG. 11, a touch sensor according to an exemplary embodiment may have an add-on structure in which a touch sensor layer 280 and a detection input electrode 281 are formed on an static electricity preventing layer 260 formed of a transparent conductive material, such as an ITO, on a second substrate 200 of a display device 1 including the first substrate 100 and the second substrate 200. The touch sensor layer 280 and the detection input electrode 281 are formed by forming a layer with a transparent conductive material, such as an ITO, on a film, and patterning the layer, and then attaching the patterned layer onto the static electricity preventing layer 260 by an adhesive layer L1 together with the film. The touch sensor layer 280 is attached to an active area AA of a display panel 300, and the detection input electrode 281 is attached to a BM area. A cover window W may be attached onto the touch sensor layer 280 by an adhesive layer L2.

Figure 12:
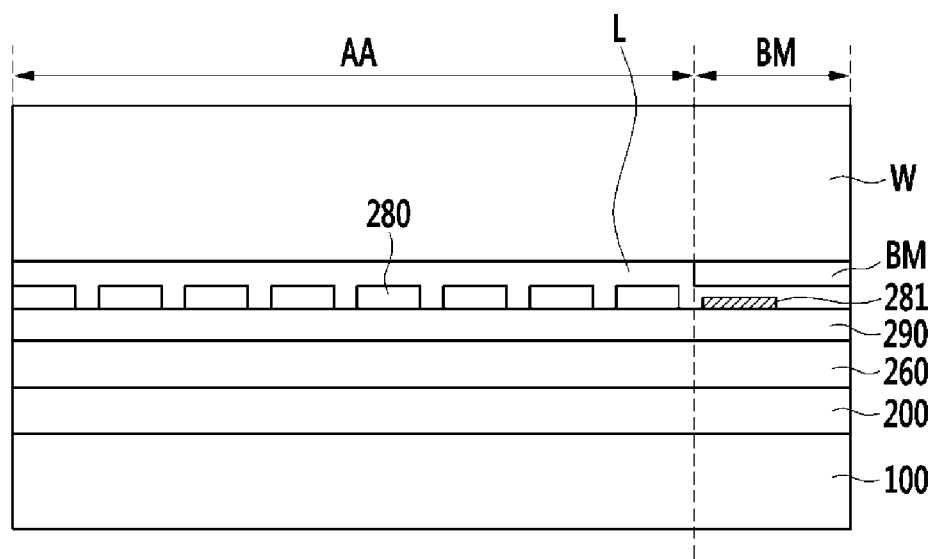

Referring to FIG. 12, a touch sensor according to an exemplary embodiment of the present invention may have an on-cell structure in which a passivation layer 290 is formed on a static electricity preventing layer 260, and a touch sensor layer 280 and a detection input electrode 281 are formed on the passivation layer 290 by patterning. The touch sensor layer 280 is attached to an active area AA of a display panel 300, and the detection input electrode 281 is attached to a BM area. A cover window W may be attached onto the touch sensor layer 280 by an adhesive layer L.

Figure 13:
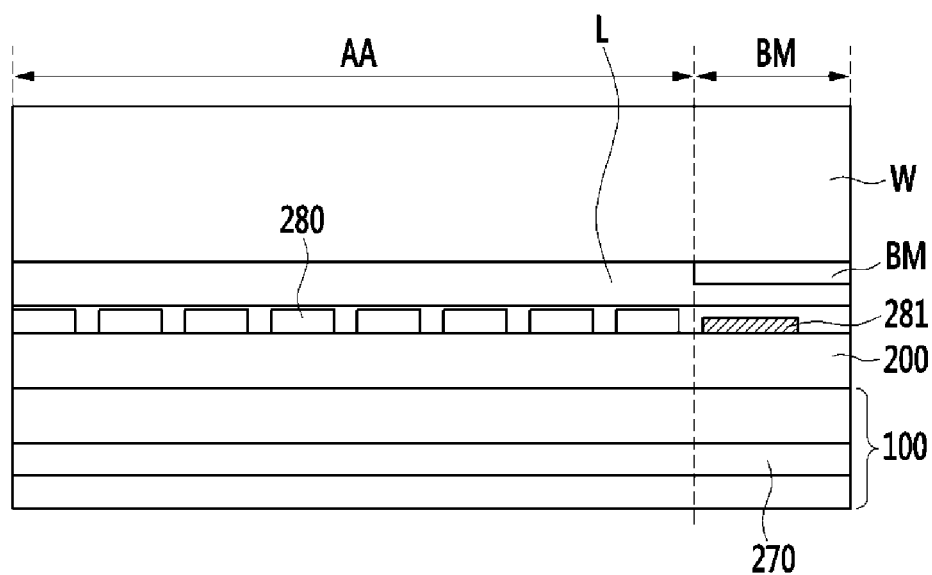

Referring to FIG. 13, a touch sensor according to an exemplary embodiment of the present invention may have a structure in which a touch sensor layer 280 and a detection input electrode 281 are formed by patterning a static electricity preventing layer formed on a second substrate 200. Accordingly, the touch sensor layer 280 may be a static electricity preventing layer. The touch sensor layer 280 is attached to an active area AA of a display panel 300, and the detection input electrode 281 is attached to a BM area. A cover window W may be attached onto the touch sensor layer 280 by an adhesive layer L.

Figure 14:
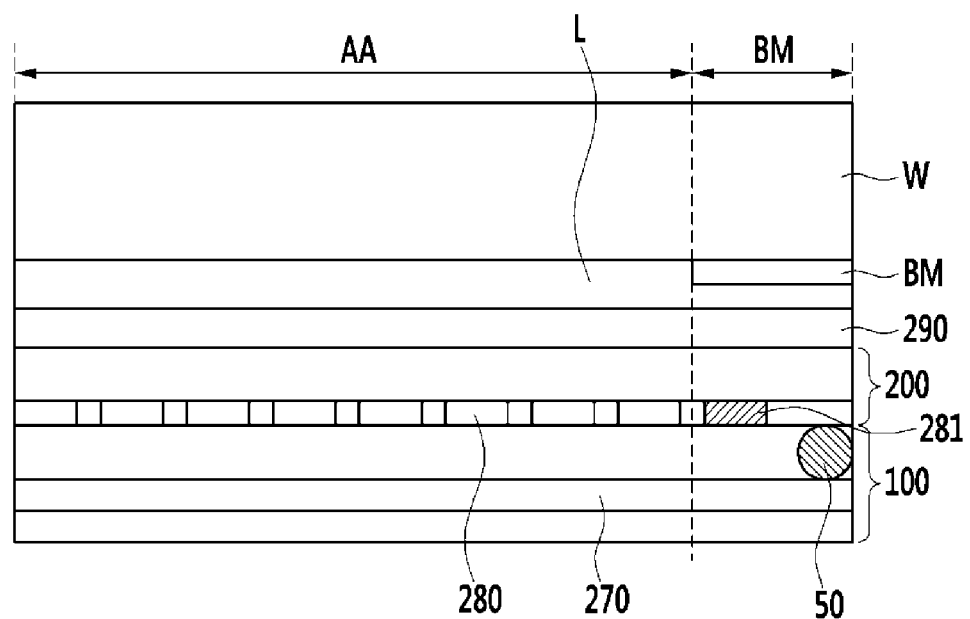

Referring to FIG. 14, a touch sensor according to an exemplary embodiment of the present invention may have a structure in which a touch sensor layer 280 and a detection input electrode 281 are formed at a second substrate 200 side at which a thin film transistor is not formed. The touch sensor layer 280 is attached to an active area of a display panel 300, and the detection input electrode 281 is attached to a BM area. When the touch sensor layer 280 and the detection input electrode 281 are formed at the second substrate 200 side, it may be difficult to connect a flexible printed circuit board (FPCB), so that a detection signal line (not illustrated) of the touch sensor layer 280 and the detection input electrode 281 may be connected to a first substrate 100 side through a conductive dot 50.

Figure 15:
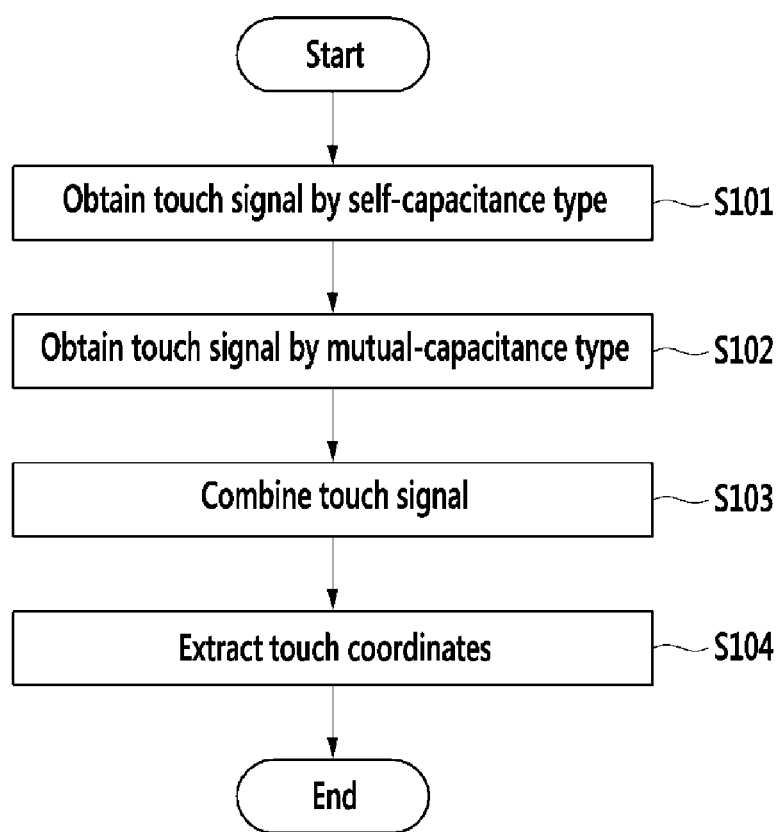
FIG. 15 is a flowchart illustrating a method of extracting touch coordinates of a display device according to an exemplary embodiment of the present invention.

FIG. 15 is a flowchart illustrating a method of extracting touch coordinates of a display device according to an exemplary embodiment of the present invention.

A display device including a touch sensor according to an exemplary embodiment of the present invention may obtain substantial portions of a touch signal by a self-capacitance type and extract touch coordinates based on the obtained touch signal.

The display device 1 including the touch sensor obtains two types of touch signals including the self-capacitance type and the mutual-capacitance type for an edge portion of the active area AA (S101 and S102), combines the touch signals (S103), and extracts touch coordinates (S104).

When an external object is in contact with the upper substrate 210 that is an insulating substrate in the edge area Ed of the display panel 300, the touch sensor controller 600 or the detection signal processor 620 may obtain a touch signal, which may be an output detection signal according to a change in capacitance Ct generated between the external object and the touch sensor electrode TSe by the self-capacitance type (S101). Further, the touch sensor controller 600 or the detection signal processor 620 may obtain a touch signal, which may be an output detection signal according to a change in capacitance Cm between the touch sensor electrode TSe and the detection input electrode Tx by the mutual-capacitance type (S102).

The touch sensor controller 600 or the detection signal processor 620 may combine the received two touch signals (S103). The touch sensor controller 600 or the detection signal processor 620 may extract coordinates of the touch signal obtained by the self-capacitance type by using interpolation, and extract coordinates of the touch signal obtained by the mutual-capacitance type by using the interpolation, to combine the two touch signals (S103). The touch sensor controller 600 or the detection signal processor 620 may extract final touch coordinates based on an average value of the coordinates of the two touch signals extracted by using the interpolation (S104).

According to an exemplary embodiment of the present invention, the touch sensor controller 600 or the detection signal processor 620 may calculate an average value according to positions of the touch sensor electrodes TSe of respective digital values of the received two touch signals and combine the signals (S103). The touch sensor controller 600 or the detection signal processor 620 may extract touch coordinates by performing interpolation on the combined signal obtained based on the average value of the two touch signals (S104).

Accordingly, when touch coordinates of the edge area Ed of the display panel 300 are extracted, touch coordinates may be calculated more precisely compared to a case where touch coordinates are calculated by one type from the self-capacitance type or the mutual-capacitance types.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:
1. A display device, comprising:
a display panel comprising pixels, an active area on which an image is configured to be displayed, and a black matrix area on which an image is not configured to be displayed;
touch sensor electrodes configured to detect a touch of an external object, the touch sensor electrodes disposed in the active area; and
detection input electrodes configured to generate mutual capacitance with the touch sensor electrodes, the detec- tion input electrodes disposed in an edge area of the display panel that overlaps the black matrix area, wherein some of the touch sensor electrodes disposed near the detection input electrodes are configured to detect the touch of the external object by a mutual-capacitance type while the remaining touch sensor electrodes are configured to detect the touch of the external object only by a self-capacitance type.

2. The display device of claim 1, further comprising:
a detection scan driver connected to the display panel;
detection input signal lines electrically connected to the touch sensor electrodes and the detection input electrodes, the detection input signal lines configured to receive a detection input signal from the detection scan driver and transmit the received detection input signal to the touch sensor electrodes and the detection input electrodes;
a detection signal processor connected to the display panel; and
detection output signal lines electrically connected to the touch sensor electrodes,
wherein the detection output signal lines are configured to receive detection output signals from the touch sensor electrodes and transmit the received detection output signals to the detection signal processor.

3. The display device of claim 2, wherein the touch sensor electrodes are configured to:
transmit a first detection output signal generated by the self-capacitance type to the detection signal processor through a first detection output signal line; and
transmit a second detection output signal generated by the mutual-capacitance type to the detection signal processor through a second detection output signal line.

4. The display device of claim 2, wherein the detection signal processor is configured to extract touch coordinates by using at least one of a first detection output signal generated by the touch sensor electrode by the self-capacitance type and a second detection output signal generated by the touch sensor electrode by the mutual-capacitance type.

5. The display device of claim 4, wherein the detection signal processor is configured to extract the touch coordinates by combining the first detection output signal and the second detection output signal.

6. The display device of claim 5, wherein the detection signal processor is configured to:
calculate an average value of a value of the first detection output signal and a value of the second detection output signal;
combine the first and second detection output signals for each position of the touch sensor electrode; and
extract the touch coordinates by performing interpolation on the combined signal based on the average value.

7. The display device of claim 5, wherein the detection signal processor is configured to:
extract first touch coordinates by performing interpolation on the first detection output signal;
extract second touch coordinates by performing the interpolation on the second detection output signal; and
extract the touch coordinates based on an average value of the first touch coordinates and the second touch coordinates.

8. The display device of claim 1, further comprising:
a touch sensor controller connected to the display panel; and
detection signal lines electrically connected to the touch sensor electrodes and the detection input electrodes,
wherein the detection signal lines are configured to:
receive a detection input signal from the touch sensor controller and transmit the received detection input signal to the touch sensor electrodes and the detection input electrodes; and
receive detection output signals from the touch sensor electrodes and transmit the received detection output signal to the touch sensor controller.

9. The display device of claim 8, wherein the touch sensor electrode is configured to:
transmit a first detection output signal generated by the self-capacitance type to the touch sensor controller through a first detection signal line; and
transmit a second detection output signal generated by the mutual-capacitance type to the touch sensor controller through a second detection signal line.

10. The display device of claim 1, wherein:
the display panel comprises:
a first substrate and a second substrate facing the first substrate;
touch sensor layers on which the touch sensor electrodes are disposed; and
a common electrode disposed on the second substrate with an insulating layer interposed therebetween;
the touch sensor electrode is configured to detect a touch of an object on an upper surface of the second substrate; and
the detection input electrodes are disposed on the second substrate.

11. The display device of claim 1, wherein:
the display panel comprises:
a first substrate and a second substrate;
a static electricity preventing layer disposed on an upper surface of the second substrate; and
touch sensor layers on which the touch sensor electrodes are disposed; and
the detection input electrodes are disposed on the static electricity preventing layer with an adhesive layer interposed therebetween.

12. The display device of claim 1, wherein:
the display panel comprises a first substrate, a second substrate, a static electricity preventing layer disposed on an upper surface of the second substrate, and touch sensor layers on which the touch sensor electrodes are disposed; and
the detection input electrodes are disposed on the static electricity preventing layer with a passivation layer interposed therebetween.

13. The display device of claim 1, wherein:
the display panel comprises a first substrate, a second substrate, a static electricity preventing layer disposed on an upper surface of the second substrate; and
the touch sensor electrodes and the detection input electrodes are disposed on the static electricity preventing layer.

14. The display device of claim 1, wherein the display panel comprises a first substrate, a second substrate, touch sensor layers on which the touch sensor electrodes are disposed, and the detection input electrodes.

15. The display device of claim 14, wherein detection signal lines disposed on the touch sensor layers are connected to the first substrate through conductive dots.

* * * * *